(12) United States Patent
Suzuki (10) Patent No.: US 9,026,184 B2
(45) Date of Patent: May 5, 2015

(54) IN-VEHICLE HANDSFREE APPARATUS

(75) Inventor: Hideaki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 1478 days.

(21) Appl. No.: 12/378,707

(22) Filed: Feb. 18, 2009

(65) Prior Publication Data

US 2009/0209297 A1 Aug. 20, 2009

(30) Foreign Application Priority Data

Feb. 19, 2008 (JP) .................................. 2008-037503
Mar. 10, 2008 (JP) .................................. 2008-059573
Mar. 14, 2008 (JP) .................................. 2008-065874

(51) Int. Cl.
*H04M 1/00* (2006.01)
*H04W 4/16* (2009.01)
*H04M 1/60* (2006.01)
*H04W 88/04* (2009.01)
*H04W 92/08* (2009.01)

(52) U.S. Cl.
CPC .............. *H04W 4/16* (2013.01); *H04M 1/6091* (2013.01); *H04W 88/04* (2013.01); *H04W 92/08* (2013.01)

(58) Field of Classification Search
USPC ................ 455/569.2, 569.1, 567, 412.1, 41.2
See application file for complete search history.

(56) References Cited

U.S. PATENT DOCUMENTS

| | | | |
|---|---|---|---|
| 5,408,528 A | 4/1995 | Carlson et al. | |
| 6,067,355 A | 5/2000 | Lim et al. | |
| 6,718,187 B1 * | 4/2004 | Takagi et al. | 455/569.2 |
| 6,993,367 B2 * | 1/2006 | Yamato et al. | 455/569.2 |
| 7,020,499 B2 * | 3/2006 | Moffi et al. | 455/569.1 |
| 7,274,288 B2 | 9/2007 | Nagata | |
| 7,308,289 B2 * | 12/2007 | Sychta | 455/569.1 |
| 7,327,226 B2 * | 2/2008 | Turnbull et al. | 340/425.5 |
| 7,349,722 B2 * | 3/2008 | Witkowski et al. | 455/569.2 |

(Continued)

FOREIGN PATENT DOCUMENTS

JP 07-048761 10/1987
JP 09-046397 2/1997

(Continued)

OTHER PUBLICATIONS

Final Office Action dated Jan. 11, 2011, in corresponding Japanese Application No. 2008-262785, with English translation thereof.

(Continued)

*Primary Examiner* — Marcos Batista
(74) *Attorney, Agent, or Firm* — Harness, Dickey & Pierce, PLC (57) ABSTRACT

An in-vehicle handsfree apparatus establishes a handsfree profile connection with a first cellular phone and a second cellular phone simultaneously. It is assumed that while the first cellular phone is in a calling state, the second cellular phone receives an incoming call. When a user operates a response to the second cellular phone in the incoming call receiving state, a suspension request signal is transmitted to the first cellular phone in the calling state to thereby switch the call link of the first cellular phone to a suspending state. In contrast, an incoming call response request signal is transmitted to the second cellular phone to thereby switch the call link of the second cellular phone from the incoming call receiving state to a calling state. The connection partner of a call sound path is changed from the first cellular phone to the second cellular phone.

3 Claims, 5 Drawing Sheets

(56) References Cited

U.S. PATENT DOCUMENTS

| | | |
|---|---|---|
| 7,376,434 B2 | 5/2008 | Thomas et al. |
| 7,689,255 B2 * | 3/2010 | Kurauchi et al. .......... 455/569.2 |
| 7,873,392 B2 | 1/2011 | Matsuda |
| 2004/0087335 A1 | 5/2004 | Peiker |
| 2004/0151285 A1 | 8/2004 | Sychta |
| 2005/0096099 A1 * | 5/2005 | Barclay et al. ............. 455/569.2 |
| 2005/0143054 A1 | 6/2005 | Fogel |
| 2005/0202852 A1 | 9/2005 | Wada |
| 2006/0040714 A1 | 2/2006 | Suzuki |
| 2006/0172780 A1 * | 8/2006 | Krippgans ................. 455/569.2 |
| 2007/0026904 A1 | 2/2007 | Matsuda |
| 2007/0037607 A1 * | 2/2007 | Matsuda ................... 455/569.2 |
| 2007/0054704 A1 | 3/2007 | Satoh |
| 2007/0066300 A1 * | 3/2007 | Nishimura et al. ......... 455/426.1 |
| 2007/0127654 A1 | 6/2007 | Lin et al. |
| 2008/0039153 A1 | 2/2008 | Katoh et al. |
| 2008/0064419 A1 | 3/2008 | Ukon |
| 2009/0209295 A1 | 8/2009 | Suzuki |
| 2009/0209296 A1 | 8/2009 | Kimura et al. |
| 2009/0209298 A1 * | 8/2009 | Abeta et al. ................ 455/569.2 |

FOREIGN PATENT DOCUMENTS

| | | |
|---|---|---|
| JP | 11-032105 | 2/1999 |
| JP | 11-068999 | 3/1999 |
| JP | 11-331328 | 11/1999 |
| JP | 2001-165668 | 6/2001 |
| JP | 2002-223288 | 8/2002 |
| JP | 2002-237869 | 8/2002 |
| JP | 2002-354109 | 12/2002 |
| JP | 2003-218996 | 7/2003 |
| JP | 2004-104298 | 4/2004 |
| JP | 2004-201249 | 4/2004 |
| JP | 2005-244875 | 9/2005 |
| JP | 2005-260822 | 9/2005 |
| JP | 2005-286553 | 10/2005 |
| JP | 2006-019908 | 1/2006 |
| JP | 2006-094477 | 4/2006 |
| JP | 2006-211365 | 8/2006 |
| JP | 2006-277827 | 10/2006 |
| JP | 2007-013541 | 1/2007 |
| JP | 2007-036678 | 2/2007 |
| JP | 2007-104343 | 4/2007 |
| JP | 2007-180947 | 7/2007 |
| JP | 2007-251455 | 9/2007 |
| JP | 2008-042717 | 2/2008 |

OTHER PUBLICATIONS

Office Action dated Dec. 22, 2009 in Japanese Application No. 2008-037503 with English translation thereof.
Office action dated Jan. 5, 2010 in corresponding Japanese Application No. 2008-262785.
Office Action dated Apr. 27, 2010 in Japanese Application No. 2008-133013 with English translation thereof.
Office Action dated Jun. 8, 2011 in corresponding U.S. Appl. No. 12/378,708.
Office Action dated Aug. 25, 2011 from the USPTO in the related U.S. Appl. No. 12/378,709.
Notice of Allowance dated Jun. 9, 2011 from the USPTO in the related U.S. Appl. No. 12/378,706.
Notice of Allowance dated Nov. 30, 2011 in corresponding US Application No. 2009/0209298.
Chinese Office Action dated Sep. 15, 2011 from SIPO in corresponding Chinese Patent Application No. 2009 1000 6452.X (with English translation).
(Second) Office Action dated Jul. 18, 2012 from SIPO in corresponding Chinese Patent Application No. 200910006452.X (with English translation).

* cited by examiner

IN-VEHICLE HANDSFREE APPARATUS

CROSS REFERENCE TO RELATED APPLICATION

This application is based on and incorporates herein by reference Japanese Patent Application No. 2008-65874 filed on Mar. 14, 2008.

FIELD OF THE INVENTION

The present invention relates to an in-vehicle handsfree apparatus capable of establishing a handsfree communication protocol connection with multiple cellular phones at the same time.

BACKGROUND OF THE INVENTION

Patent document 1: JP-2006-94477 A (corresponding to US 2006/0040714)

Patent document 1 describes an in-vehicle handsfree apparatus which establishes a handsfree profile connection with a cellular phone, which is brought into a passenger compartment of a vehicle.

Some users recently carry about together more than one cellular phone for private and business uses in recent years. Thus, the inventor assumes that an in-vehicle handsfree apparatus might be required to anticipate a case that multiple cellular phones are brought into a passenger compartment of the relevant vehicle. In other words, the inventor assumes that an in-vehicle handsfree apparatus might be required which has a function to establish a handsfree profile connection with each of the multiple cellular phones at the same time (referred to as a function for multi-profile connection) to thereby allow all the cellular phones to be in a handsfree standby state.

Further, even if an in-vehicle handsfree apparatus might be provided with such a function for multi-profile connection with multiple cellular phones as the inventor assumes, a situation might be assumed that while one of the cellular phones with which a handsfree profile connection is being simultaneously established is in a calling state, another cellular phone may receive an incoming call and responding to such an incoming call might be required. Herein, there is no technology to respond to such a situation.

SUMMARY OF THE INVENTION

The present invention is made in view of the above situation. It is an object of the present invention to provide an in-vehicle handsfree apparatus to switch a call link with respect to multiple cellular phones with which a handsfree profile connection is established at the same time to thereby enhance the user's usability.

To achieve the above object, according to an example of the present invention, an in-vehicle handsfree apparatus is provided as follows. A handsfree connection section is configured to establish a handsfree communication protocol connection with a cellular phone having a function to (i) switch a call link, which is in a calling state, to a suspending state when a suspension request signal is issued and (ii) switch a call link, which is in an incoming call receiving state, to a calling state when an incoming call response request signal is issued. A control section is configured to perform a notice of a different phone interruption incoming call, the notice of the different phone interruption incoming call being performed in case of a plurality of cellular phones with which the handsfree connection section establishes a handsfree communication protocol connection simultaneously, a second cellular phone receives an incoming call when a first cellular phone is in a calling state. A different phone interruption incoming call response operation section is configured for a user to perform a response operation to the different phone interruption incoming call in response to the notice of the different phone interruption incoming call. Herein, the control section is further configured to, when the user performs the response operation to the difference phone interruption incoming call, (i) issue a suspension request signal to the first cellular phone in the calling state and an incoming call response request signal to the second cellular phone in the incoming call receiving state and (ii) switch a connection partner of a call sound path from the first cellular phone to the second cellular phone, the call sound path via which the handsfree connection section carries a transmission sound and a reception sound.

Under the above configuration, by the issuance or instruction of the suspension request, a call link under the calling state in the first cellular phone is switched to the suspending state, whereas by the issuance or instruction of an incoming call response request to the second cellular phone under the incoming call receiving state, a call link under the incoming call receiving state in the second cellular phone is switched to the calling state. This allows the switching of a call link with respect to each of the multiple cellular phones with which a handsfree profile connection is established at the same time. The user's usability can be thus improved.

According to another example of the present invention, a method is provided for switching call links of a first cellular phone and a second cellular phone included in a plurality of cellular phones with which an in-vehicle handsfree apparatus simultaneously establishes a handsfree communication protocol connection. The method comprises: (a) performing a notice when a different phone interruption incoming call takes place in case the second cellular phone receives an incoming call when the first cellular phone is in a calling state; (b) receiving a response operation to the different phone interruption incoming call in response to the notice of the different phone interruption incoming call; (c) issuing, in response to the received response operation, (i) a suspension request signal to the first cellular phone to thereby switch a call link of the first cellular phone, which is in a calling state, to a suspending state, and (ii) an incoming call response request signal to the second cellular phone to thereby switch a call link of the second cellular phone, which is in an incoming call receiving state, to a calling state; and (d) switching, in response to the received response operation, from the first cellular phone to the second cellular phone a connection partner of a call sound path via which a transmission sound and a reception sound is carried in the calling state.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment according to the present invention will be explained with reference to drawings. In addition, the following explains an example, in which each of multiple cellular phones has a Bluetooth (registered trademark, referred to as BT) communication function and the multiple cellular phones are brought in a passenger compartment of a vehicle.

Figure 1:
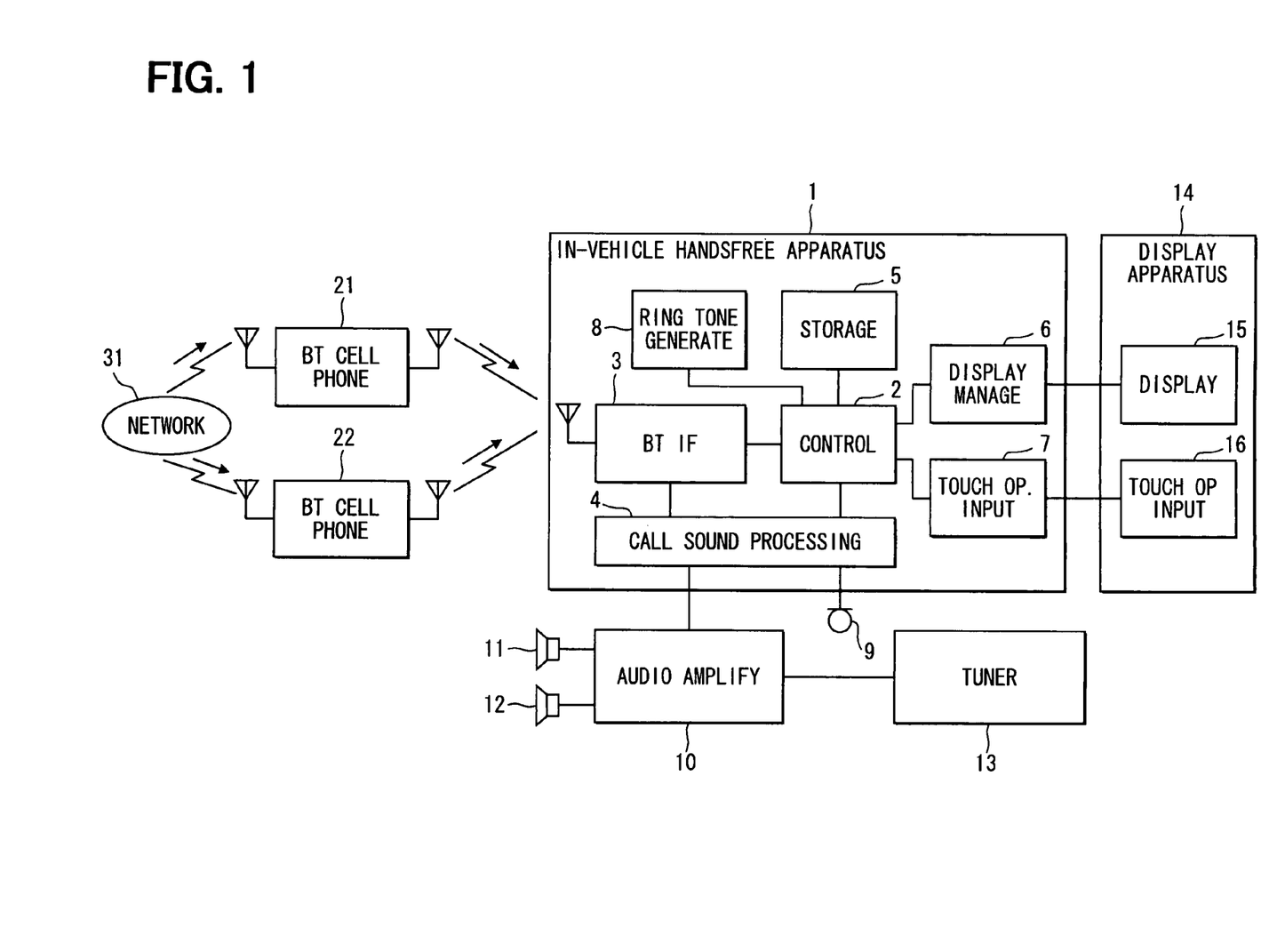
FIG. 1 is a functional block diagram according to an embodiment of the present invention.

An in-vehicle handsfree apparatus 1 according to an embodiment of the present invention is mounted in a vehicle and includes a control section 2, a BT interface section 3, a call sound processing section 4, a storage section 5, a display management section 6, a touch operation input section 7, and a ring tone generation section 8. The BT interface section 3 may function as an example of a handsfree connection means or section.

The control section 2 includes a CPU, RAM, ROM, I/O bus, etc., and controls an overall operation of the in-vehicle handsfree apparatus 1 such as a communication operation, a data control operation, etc. The BT interface section 3 supports (i.e., is compliant with) several profiles standardized by the communication standard of the BT such as a handsfree profile (HFP) for a handsfree telephone call and a phonebook access profile (PBAP) for transmission of telephone book data, historical outgoing call data, or historical incoming call data. The BT interface section 3 is further capable of multi-profile connection, which allows a handsfree profile to be simultaneously connected with each of two or more cellular phones compliant with the BT (referred to as a BT-compliant cellular phone). In other words, the BT interface section 3 can establish a handsfree profile connection with each of multiple BT-compliant cellular phones.

A first cellular phone 21 and a second cellular phone 22 have a BT communication function. Both cellular phones 21, 22 are brought in a passenger compartment of the vehicle at the same time. If the first cellular phone 21 and the second cellular phone 22 exist within the BT communication area covered by the BT interface section 3, the BT interface section 3 establishes a handsfree profile connection with the first cellular phone 21 and the second cellular phone 22 at the same time. Herein, the above profiles signify communication protocols defined for every function.

The call sound processing section 4 is connected with a microphone 9 and an audio amplifier 10. The microphone 9 is arranged at a position to easily collect user's utterance, for instance, at a vicinity of a steering wheel in the passenger compartment. The audio amplifier 10 is arranged outside of or separate from the in-vehicle handsfree apparatus 1. When performing a handsfree telephone call using one of the first and second cellular phones 21, 22 brought in the passenger compartment, the call sound processing section 4 operates the following. When receiving a call sound which the user utters as a transmit sound via the microphone 9, the call sound processing section 4 operates a speech processing of the received transmit sound and outputs it to the BT interface section 3. When receiving a reception sound via the BT interface section 3, the call sound processing section 4 outputs the received reception sound to the audio amplifier 10. When the audio amplifier 10 receives the reception sound from the call sound processing section 4, the audio amplifier 10 amplifies the received reception sound and outputs the amplified sound via the speakers 11, 12.

The speaker 11 and the speaker 12 are arranged symmetrically with respect to the full length direction of the vehicle mounted with the present in-vehicle handsfree apparatus 1. For example, the speaker 11 is arranged at the driver's seat door, while the speaker 12 is arranged at the front passenger's seat door. In addition, the audio amplifier 10 is also connected to a tuner deck 13. For instance, the tuner deck 13 receives a musical tune sound from a storage medium for music, or a radio program from a radio station and outputs them to the audio amplifier 10. The audio amplifier 10 amplifies the received musical tune sound and the radio program, and outputs the amplified sounds via the speakers 11, 12.

The storage section 5 can store various data such as: phonebook data indicating correspondence between phone numbers and registration names; historical outgoing call data indicating correspondence between outgoing call clock times and destination phone numbers with respect to outgoing call from the in-vehicle handsfree apparatus 1 or cellular phones 21, 22 with which a handsfree profile connection is established; and historical incoming call data indicating correspondence between incoming call clock times and source phone numbers with respect to incoming call to cellular phones 21, 22 with which the in-vehicle handsfree apparatus 1 establishes a handsfree profile connection.

A display apparatus 14 includes (i) a display device 15 having a screen for displaying a display window and (ii) a touch operation input device 16, which is formed on the screen. Herein, the touch operation input device 16 may function as an example of a operation section or means for a different phone interruption incoming call response, an identical phone interruption incoming call response, or a call partner switching. The display management section 6 controls a display operation of the display device 15 based on a display command signal, which is received from the control section 2. The touch operation input section 7 receives an operation detection signal via the touch operation input device 16 according to the user having operated the touch switch currently formed on the display screen. The touch operation input section 7 outputs the received operation detection signal to the control section 2. The control section 2 analyzes and processes the received operation detection signal.

The ring tone generation section 8 generates a monotone sound having a predetermined frequency band as a ring tone. Here, the user can select one of multiple ring tones by operating the touch switch. The control section 2 generates the ring tone which the user selected by using the ring tone generation section 8.

The cellular phones 21, 22 have types of being compliant and not compliant with an in-band ring tone. The type being compliant signifies the type having a function to transmit a ring tone while the type being not compliant signifies the type having no function to transmit a ring tone. That is, if each of the cellular phone 21 and the cellular phone 22 is compliant with the in-band ring tone, the following takes place. The cellular phone 21, 22 receives an incoming call (i.e., an incoming call signal) from the cellular phone network 31 under the state in which the handsfree profile connection is established with the in-vehicle handsfree apparatus 1. The cellular phone 21, 22 then transmits identification information (for example, telephone number registered inside) and an incoming call notice signal to the in-vehicle handsfree apparatus 1, and, furthermore, transmits a ring tone registered inside, to the in-vehicle handsfree apparatus 1. In contrast, if each of the cellular phone 21 and the cellular phone 22 is not compliant with the in-bond ring tone, the following takes place. The cellular phone 21, 22 receives an incoming call signal from the cellular phone network 31 under the state in which the handsfree profile connection is established with the in-vehicle handsfree apparatus 1. Although the cellular phone 21, 22 then transmits identification information and an incoming call notice signal to the in-vehicle handsfree apparatus 1, the cellular phone 21, 22 does not transmit a ring tone registered inside to the in-vehicle handsfree apparatus 1.

When the control section 2 receives the ring tone along with the incoming call notice signal and identification information from the cellular phone 21, 22, the control section 2 outputs the received ring tone (ring tone registered in the cellular phone 21, 22) via the speakers 11, 12. It is thus reported that the cellular phone 21, 22 has received an incoming call (i.e., an incoming call signal). In contrast, when the control section 2 receives no ring tone along with the incoming call notice signal and identification information from the cellular phone 21, 22, the control section 2 generates a ring tone by using the ring tone generation section 8. The control section 2 outputs the generated ring tone via the speakers 11, 12 to thereby report that the cellular phone 21, 22 has received an incoming call.

Figure 2:
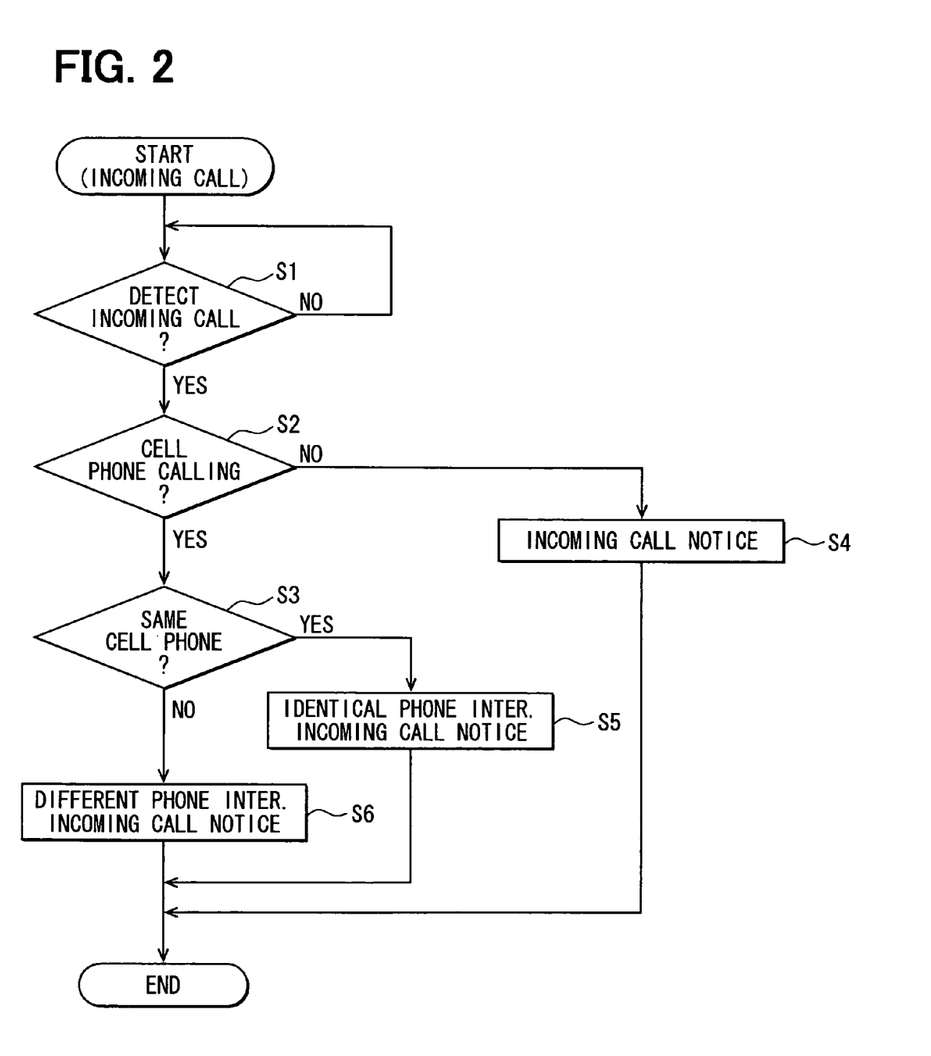
FIG. 2 is a flowchart of an incoming call notice.
Figure 3:
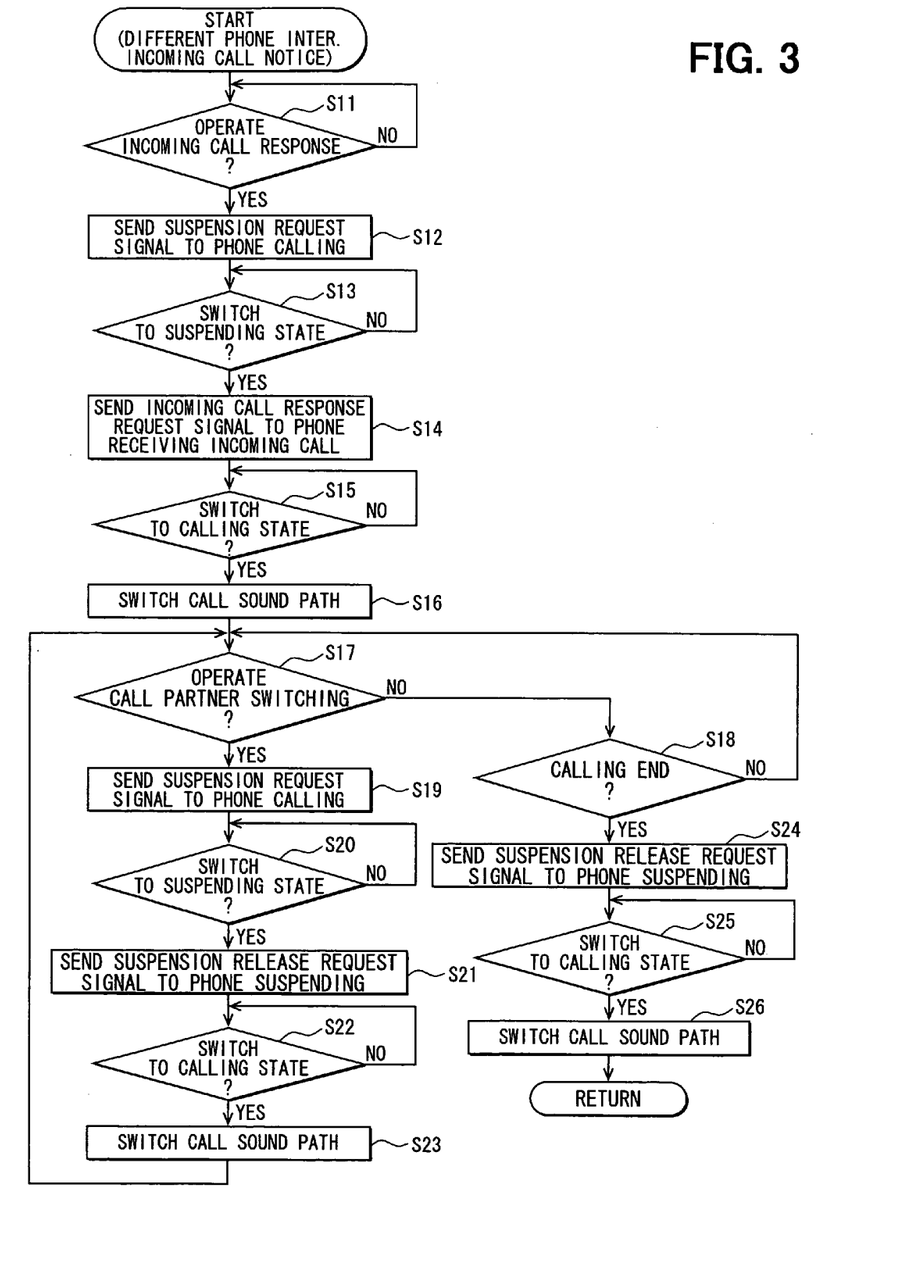
FIG. 3 is a flowchart of a different phone interruption incoming call notice process.

An operation under the above configuration is explained with reference to FIGS. 2 to 5. FIGS. 2, 3 illustrate flowcharts of processes executed by the control section 2 of the in-vehicle handsfree apparatus 1.

In the in-vehicle handsfree apparatus 1, the control section 2 starts an incoming call process. It is determined whether the BT interface section 3 has received an incoming call notice signal from either the cellular phone 21 or the cellular phone 22. It is thus determined whether either the cellular phone 21 or the cellular phone 22 has received an incoming call (i.e., an incoming call signal) at S1.

When the control section 2 determines that either has received an incoming call (S1: YES), it is determined whether any cellular phone being in the calling state exists presently at S2. When it is determined that a cellular phone in a calling state does not exist presently (S2: NO), the processing proceeds to an incoming call notice process at S4.

In contrast, when it is determined that the cellular phone in the calling state exists presently (S2: YES), it is determined whether the cellular phone in the call state is the same as the cellular phone having received the incoming call at S3 based on whether the identification information which is received from the cellular phone in the calling state is the same as that which is received from the cellular phone having received the incoming call. The control section 2 determines that the identification information which is received from the cellular phone in the calling state is the same as that which is received from the cellular phone having received an incoming call to thereby determine that the cellular phone in the calling state is the same as that having received an incoming call (S3: YES). The processing proceeds to an identical phone incoming call interruption notice process at S5. In contrast, the control section 2 determines that the identification information which is received from the cellular phone in the calling state is not the same as that which is received from the cellular phone having received the incoming call to thereby determine that the cellular phone in the calling state is different from that having received the incoming call (S3: NO). The processing then proceeds to a different phone incoming call interruption notice process at S6.

That is, the identical phone incoming call interruption notice process signifies an interruption notice process executed at the following case. When the in-vehicle handsfree apparatus 1 establishes a handsfree profile with cellular phones, a first cellular phone of the cellular phones is in a calling state, and the same first cellular phone receives an incoming call signal during the calling state. In contrast, the different phone incoming call interruption notice process signifies an interruption notice process executed at the following case. When the in-vehicle handsfree apparatus 1 establishes a handsfree profile connection with cellular phones, a first cellular phone of the cellular phones is in a calling state, and a second cellular phone different from the first cellular phone receives an incoming call signal while the first cellular phone is under the calling state.

Figure 4:
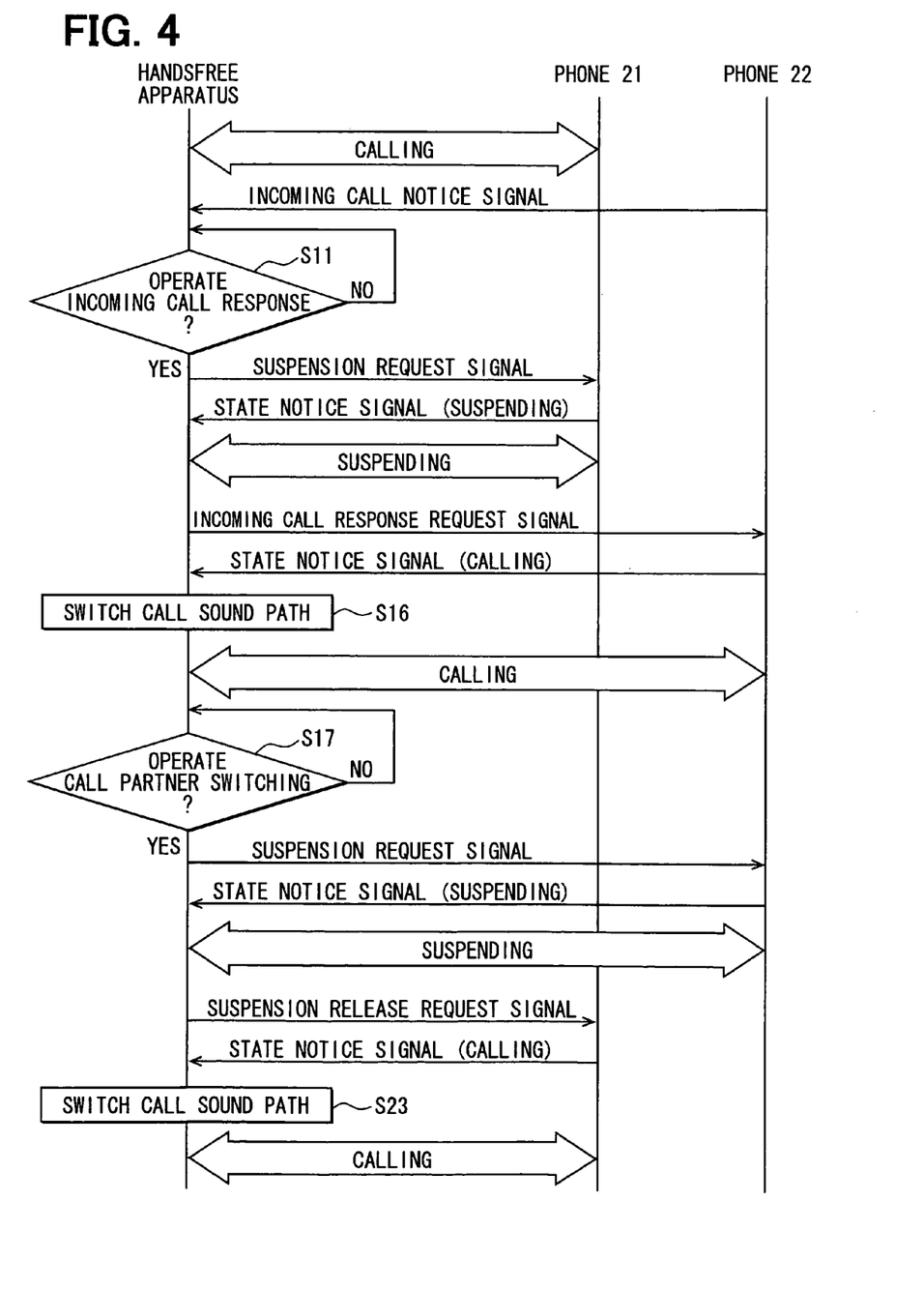
FIG. 4 is a sequence diagram of the different phone interruption incoming call notice process.

The different phone interruption incoming call notice process and the identical phone interruption incoming call notice process are explained one by one. First, the different phone interruption incoming call notice process is explained with reference to FIG. 3 and FIG. 4. FIG. 4 illustrates a case that while a first cellular phone 21 is already in a calling state (i.e., under a telephone call), a second cellular phone 22 receives an incoming call (also referred to as an incoming call signal). In such a case, regardless of whether the in-vehicle handsfree apparatus 1 receives from the second cellular phone 22 an incoming call tone (i.e., a ring tone) registered in the second cellular phone 22, the ring tone generation section 8 generates a ring tone which is able to notify a user of the incoming call without a trouble in hearing reception sounds of the calling. The generated ring tone is outputted.

As starting a different phone incoming call interruption notice process, the control section 2 outputs a reception sound received from the first cellular phone 21, which is presently under the calling state, via the speakers 11, 12. Simultaneously, the control section 2 outputs the ring tone generated by the ring tone generation section 8 via the speakers 11, 12. The user is thus notified that the second cellular phone 22 has received an incoming call. Then the control section 2 determines at S11 whether the user operates an incoming call response (i.e., performs an incoming call response operation).

When the user operates an incoming call response via the switch aside of the steering wheel or the touch switch presently formed in the touch operation input device 16, the control section 2 determines that the user has operated the incoming call response (S11: YES). The control section 2 then transmits a suspension request signal (also referred to as a suspension request) to the first cellular phone 21 which is under the calling state via the BT interface section 3 at S12. When the first cellular phone 21 in the calling state receives the suspension request signal from the control section 2 or the in-vehicle handsfree apparatus 1, the first cellular phone 21 switches a call link, which is in the calling state, to the suspending state, and transmits a state notice signal, which indicates that the first cellular phone 21 itself is switched to the suspending state, to the in-vehicle handsfree apparatus 1.

By receiving the state notice signal via the BT interface section 3 from the first cellular phone 21 in the calling state, the control section 2 determines that the call link of the first cellular phone 21 is switched from the calling state to the suspending state (S13: YES) and transmits or issues an incoming call response request signal (also referred to as an incoming call response) to the second cellular phone 22 via the BT interface section 3 having received the incoming call at S14. When the second cellular phone 22 having received the incoming call (i.e., when the second cellular phone 22 is presently in the incoming call receiving state) receives the incoming call response request signal from the in-vehicle handsfree apparatus 1, the second cellular phone 22 switches a call link, which is in the incoming call receiving state, to a calling state, and transmits a state notice signal, which indicates that the second cellular phone 22 itself is switched to the calling state, to the in-vehicle handsfree apparatus 1.

By receiving the state notice signal via the BT interface section 3 from the second cellular phone 22 having received the incoming call, the control section 2 determines that the call link of the second cellular phone 22 is switched from the incoming call receiving state to the calling state (S15: YES) and switches a connection partner of the call sound path, via which the BT interface section 3 carries a transmit sound and reception, from the first cellular phone 21 to the second cellular phone 22 at S16. In the above configuration, in case that the second cellular phone 22 receives an incoming call when the first cellular phone 21 is already in the calling state, a user can operate an incoming call response to thereby switch the call link of the first cellular phone 21 from the calling state to the suspending state. Thus, the user can have a telephone call with a call partner, which has called to the second cellular phone 22 as a call destination.

Subsequently, the control section 2 determines at S17 whether the user operates a call partner switching (i.e., a user performs a call partner switching operation), and further determines at S18 whether the second cellular phone 22 ends the calling or telephone call. Before the telephone call of the second cellular phone 22 is completed, the user may operate a call partner switching via the switch aside of the steering wheel or the touch switch currently formed in the touch operation input device 16. In this case, the control section 2 determines that the user has operated the call partner switching (S17: YES), and transmits or issues a suspension request signal to the second cellular phone 22, which is in the calling state, via the BT interface section 3 at S19. When the second cellular phone 22 in the calling state receives the suspension request signal from the in-vehicle handsfree apparatus 1, the second cellular phone 22 switches a call link, which is in the calling state, to the suspending state, and transmits a state notice signal, which indicates that the second cellular phone 22 itself is switched to the suspending state, to the in-vehicle handsfree apparatus 1.

By receiving the state notice signal via the BT interface section 3 from the second cellular phone 21 having been in the calling state, the control section 2 determines that the call link, which is in the calling state, of the second cellular phone 22 is completed (S20: YES), and then transmits or issues a suspension release request signal to the first cellular phone 21, which is in the suspending state, via the BT interface section 3 at S21. When the first cellular phone 21 in the suspending state receives the suspension release request signal from the in-vehicle handsfree apparatus 1, the first cellular phone 21 switches a call link, which is in the suspending state, to the calling state, and transmits a state notice signal, which indicates that the first cellular phone 21 itself is switched to the calling state, to the in-vehicle handsfree apparatus 1.

By receiving the state notice signal via the BT interface section 3 from the first cellular phone 21, the control section 2 determines that the call link, which has been in the suspending state, of the first cellular phone 21 is switched to the calling state (S22: YES). The control section 2 then switches a connection partner of the call sound path from the second cellular phone 22 to the first cellular phone 21 at S23. The processing then returns to S17. Thus, by operating the call partner switching, the user can perform the switching of the call links, i.e., switches the second cellular phone 22 from the calling state to the suspending state while switching the first cellular phone 21 from the suspending state to the calling state. Thus, the user can have a telephone call again with a call partner, which called to the first cellular phone 21 as a call destination before the second cellular phone 22 received an incoming call.

In contrast, when the control section 2 determines that the calling state or telephone call of the second cellular phone 22 is completed before the user operates the call partner switching (S18: YES), it transmits or issues a suspension release request signal to the first cellular phone 21 which is in the suspending state at S24. When the first cellular phone 21 in the suspending state receives the suspension release request signal from the in-vehicle handsfree apparatus 1, it switches a call link, which is in the suspending state, to the calling state, and transmits a state notice signal, which indicates that the first cellular phone 21 is switched to the calling state, to the in-vehicle handsfree apparatus 1.

By receiving the state notice signal via the BT interface section 3 from the first cellular phone 21, the control section 2 determines that the call link, which is in the suspending state, of the first cellular phone 21 is switched to the calling state (S25: YES). The control section 2 then switches a connection partner of the call sound path from the second cellular phone 22 to the first cellular phone 21 at S26. The processing then returns.

The above explains the case that when the first cellular phone 21 is in the calling state, the second cellular phone 22 receives an incoming call signal. However, by contrast, another case can be explained that when the second cellular phone 22 is in the calling state, the first cellular phone 21 receives an incoming call signal.

Figure 5:
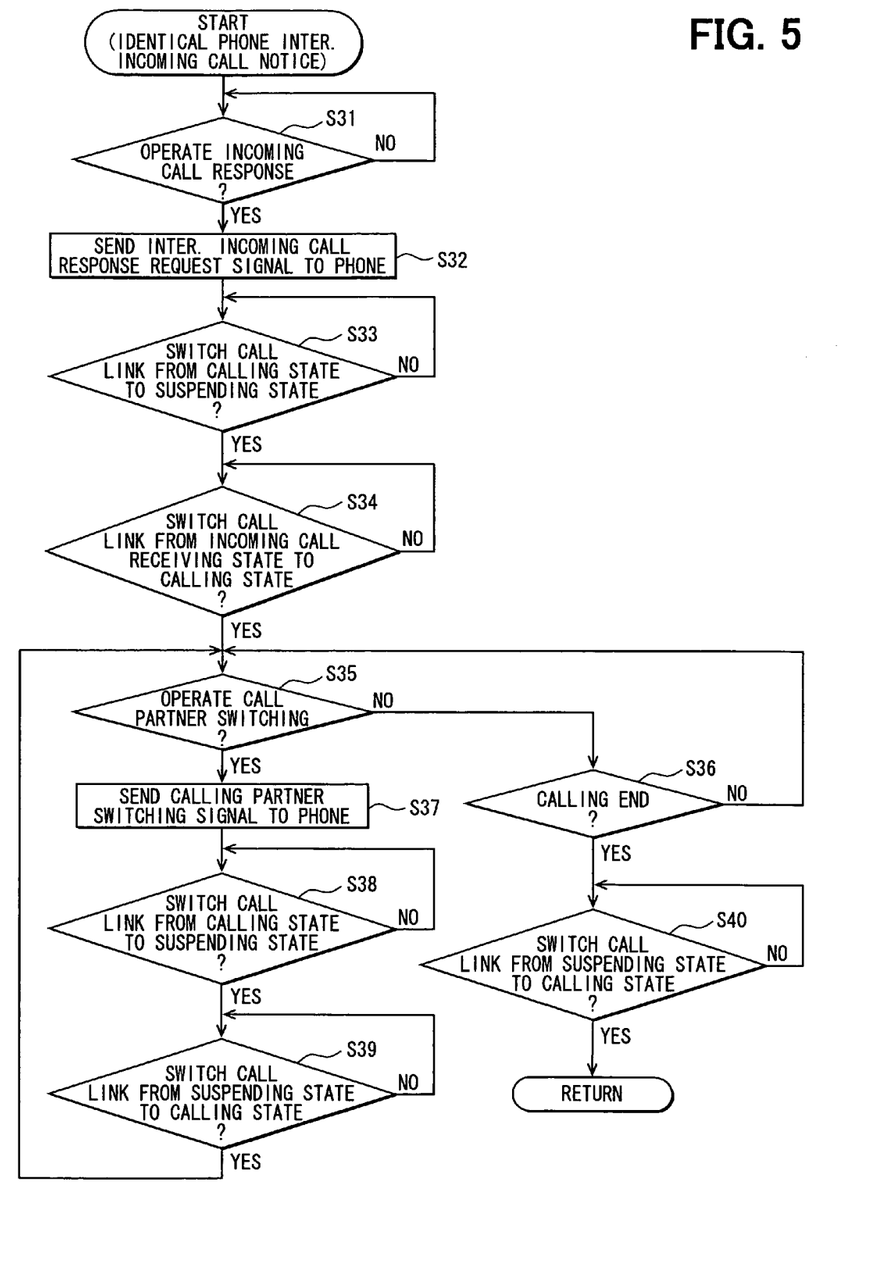
FIG. 5 is a flowchart of an identical phone interruption incoming call notice process.

Next, the identical phone interruption incoming call notice process is explained with reference to FIG. 5. FIG. 5 illustrates a case that while a first cellular phone 21 is already in a calling state or under a telephone call, a second cellular phone 22 receives an incoming call signal. Herein, the first cellular phone 21 contracts the incoming call interruption notice service which the cellular phone network 31 provides. Thus, in case that the second cellular phone 22 receives an incoming call when the first cellular phone 21 is in the calling state, a ring tone, which is specified in the service and transmitted from the cellular phone network 31, is outputted via the speakers 11, 12.

As starting an identical phone incoming call interruption notice process, the control section 2 outputs a reception sound received from the first cellular phone 21 in the calling state via the speakers 11, 12, while outputting a ring tone, which is specified in the service and transmitted from the cellular phone network 31 via the speakers 11, 12. The user is thereby notified of the first cellular phone 21 having received an incoming call, and it is determined whether the user operates an incoming call response at S31.

When the user operates an incoming call response via the switch aside of the steering wheel or the touch switch currently formed in the touch operation input device 16, the control section 2 determines that the user has operated the incoming call response (S11: YES), and transmits or issues an interruption incoming call response request signal (referred to as an interruption incoming call response request) to the first cellular phone 21 via the BT interface section 3 at S32. When receiving the interruption incoming call response request signal from the in-vehicle handsfree apparatus 1, the second cellular phone 22 switches the call link, which has been in the calling state, to the suspending state, while switching the call link, which has been in the suspending state, to the calling state.

Next, the control section 2 determines that the call link, which has been in the calling state, in the first cellular phone 21 is switched from the calling state to the suspending state (S33: YES) and determines that the call link, which has been in the incoming call receiving state, in the first cellular phone 21 is switched from the incoming call receiving state to the calling state (S34: YES). The control section 2 thus identifies that the call link state in the first cellular phone 21 has changed.

Subsequently, the control section 2 determines at S35 whether the user operates a call partner switching, and further determines whether the calling state or telephone call of the first cellular phone 21 is completed at S36. Herein, before the telephone call of the second cellular phone 21 is completed, the user may operate a call partner switching via the switch aside of the steering wheel or the touch switch currently formed in the touch operation input device 16. In this case, the control section 2 determines that the user has operated the call partner switching (S35: YES), and transmits or issues a call partner switching signal to the first cellular phone 21 via the BT interface section 3 at S37. When receiving the call partner switching signal from the in-vehicle handsfree apparatus 1, the first cellular phone 21 switches the call link, which has been in the calling state, to the suspending state, while switching the call link, which has been in the suspending state, to the calling state.

The control section 2 then determines that the call link of the first cellular phone 21 is switched from the calling state to the suspending state (S38: YES) and determines that the call link, which has been in the suspending state, of the first cellular phone 21 is switched to the calling state (S39: YES). The control section 2 thus identifies that the call link state in the first cellular phone 21 has changed. The processing then returns to S35.

In contrast, before the user operates a call partner switching via the switch aside of the steering wheel or the touch switch currently formed in the touch operation input device 16, the telephone call or the calling state of the first cellular phone 21 may be completed. In this case, the control section 2 determines that the telephone call of the first cellular phone 21 is completed (S36: YES), and determines that the call link, which has been in the suspending state, in the first cellular phone 21 is switched to the calling state (S40: YES). The processing then returns. That is, in the identical phone interruption incoming call notice process, unlike the above-mentioned different phone interruption incoming call notice process, the control section 2 does not switch a connection partner of the call sound path, via which the BT interface section 3 carries a transmit sound and reception sound, between cellular phones 21, 22.

Incidentally, under the above-mentioned configuration, in both the different phone interruption incoming call notice process and the identical phone interruption incoming call notice process, the ring tone is outputted simultaneously when the reception sound is outputted via the speakers 11, 12. It is thus more desirable that the ring tones are differentiated therebetween in the different phone interruption incoming call notice process and the identical phone interruption incoming call notice process. Such a configuration can achieve the user's recognition with respect to not only an incoming call, but also, whether an incoming call is arriving at a first cellular phone under telephone call or a second cellular phone different from the first cellular phone.

As explained above, the in-vehicle handsfree apparatus 1 according to the embodiment operates as follows. A handsfree profile is connected at the same time with at least a first cellular phone 21 and a second cellular phone 22. Herein, assume the case that while the first cellular phone 21 is under telephone call (i.e., in the calling state), the second cellular phone 22 receives an incoming call (i.e., incoming call signal). In this case, if a user performs a response operation to the second cellular phone 22 receiving the incoming call, a suspension request signal is transmitted to the first cellular phone 21 under the telephone call (i.e., in the calling state). The call link state of the first cellular phone 21 is switched from the calling state to the suspending state. In contrast, an incoming call response request signal is transmitted to the second cellular phone 22 to thereby switch the call link of the second cellular phone 22 from the incoming call receiving state to the calling state. Further, a connection partner of the call sound path, via which the BT interface section 3 carries a transmit sound and reception sound to a cellular phone, is switched from the first cellular phone 21 to the second cellular phone 22. Thus, the call state can be changed in each of the first cellular phone 21 and the second cellular phone 22. The user's usability can be thus enhanced.

Furthermore, a handsfree profile is connected at the same time with at least a first cellular phone 21 and a second cellular phone 22. Herein, assume the case that while the second cellular phone 22 is under telephone call (i.e., in the calling state), the first cellular phone 21 is in the suspending state. In this case, if a user operates the call partner switching, a suspension request signal is transmitted to the second cellular phone 22 under the telephone call to thereby switch the call link of the second cellular phone 22 from the calling state to the suspending state. Furthermore, a suspension release request signal is transmitted to the first cellular phone 21 in the suspending state to thereby switch the call link of the first cellular phone 21 from the suspending state to the calling state. Further, a connection partner of the call sound path is switched from the second cellular phone 22 to the first cellular phone 21. Thus, even after responding to the incoming call, the call link state can be changed in each of the first cellular phone 21 and the second cellular phone 22.

The present invention is not limited only to the above-mentioned embodiment, and can be modified or extended as follows. The function of the in-vehicle handsfree apparatus 1 may be included in another in-vehicle apparatus, such as an in-vehicle navigation apparatus. The ring tone transmitted to the in-vehicle handsfree apparatus 1 from the cellular phone 21, 22 may be a musical tune (so called "ringer melody").

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An in-vehicle handsfree apparatus comprising:
   a handsfree connection section configured to
      establish a handsfree communication protocol connection with a cellular phone having a function to
         (i) switch a call link, which is in a calling state, to a suspending state when a suspension request signal or an interruption incoming call response request signal is issued, and
         (ii) switch a call link, which is in an incoming call receiving state, to a calling state when an incoming call response request signal or an interruption incoming call response request signal is issued;
   a control section configured to, in cases where there is an incoming call when a first cellular phone is in a calling state, the first cellular phone being included in a plurality of cellular phones with which the handsfree connection section establishes a handsfree communication protocol connection simultaneously,
- (i) determine whether the first cellular phone in the calling state is receiving the incoming call or a second cellular phone different from the first cellular phone is receiving the incoming call, the second cellular phone being included in the plurality of cellular phones, and
- (ii) perform
  - (a) a notice of a different phone interruption incoming call, when determining that the second cellular phone is receiving the incoming call, and
  - (b) a notice of an identical phone interruption incoming call, when determining that the first cellular phone in the calling state is receiving the incoming call;

a different phone interruption incoming call response operation section configured for a user to perform a response operation to the different phone interruption incoming call in response to the notice of the different phone interruption incoming call; and an identical phone interruption incoming call response operation section configured for the user to perform a response operation to the identical phone interruption incoming call in response to the notice of the identical phone interruption incoming call, the control section being further configured to:
- (i) when the user performs the response operation to the difference phone interruption incoming call,
  - (a) issue a suspension request signal to the first cellular phone in the calling state and an incoming call response request signal to the second cellular phone in the incoming call receiving state and
  - (b) switch a connection partner of a call sound path from the first cellular phone to the second cellular phone, the call sound path via which the handsfree connection section carries a transmission sound and a reception sound; and
- (ii) when the user performs the response operation to the identical phone interruption incoming call,
  - (a) issue an interruption incoming call response request signal to the first cellular phone that is in the calling state.

2. The in-vehicle handsfree apparatus according to claim 1, further comprising:
a call partner switching operation section configured for a user to operate a call partner switching,
the handsfree connection section being further configured to establish a handsfree communication protocol connection with a cellular phone having a function to switch a call link from a suspending state to a call state when a suspension release request signal is issued,
the control section being further configured to,
in case that the user operates the call partner switching via the call partner switching operation section when the first cellular phone is in the suspending state and the second cellular phone is in the calling state,
- (i) issue a suspension request signal to the second cellular phone in the calling state and a suspension release request signal to the first cellular phone in the suspending state, and
- (ii) switch the connection partner of the call sound path from the second cellular phone to the first cellular phone.

3. A method for an in-vehicle handsfree apparatus to switch call links of a first cellular phone and a second cellular phone included in a plurality of cellular phones with which the in-vehicle handsfree apparatus simultaneously establishes a handsfree communication protocol connection, the method comprising:

determining, in cases where there is an incoming call when the first cellular phone is in a calling state, whether the first cellular phone in the calling state is receiving the incoming call or a second cellular phone different from the first cellular phone is receiving the incoming call;

performing a notice when it is determined that a different phone interruption incoming call takes place by determining that the second cellular phone is receiving the incoming call when the first cellular phone is in the calling state;

then receiving a response operation to the different phone interruption incoming call in response to the notice of the different phone interruption incoming call;

then issuing, in response to the received response operation,
- (i) a suspension request signal to the first cellular phone to switch a call link of the first cellular phone, which is in the calling state, to a suspending state, and
- (ii) an incoming call response request signal to the second cellular phone to thereby switch a call link of the second cellular phone, which is in an incoming call receiving state, to a calling state;

then switching, in response to the received response operation, from the first cellular phone to the second cellular phone a connection partner of a call sound path via which a transmission sound and a reception sound is carried in the calling state;

performing a notice when it is determined that an identical phone interruption incoming call takes place by determining that the first cellular phone in the calling state is receiving the incoming call;

then receiving a response operation to the identical phone interruption incoming call in response to the notice of the identical phone interruption incoming call; and then issuing, in response to the received response operation,
- (i) an interruption incoming call response request signal to the first cellular phone to switch a call link of the first cellular phone, which is in the calling state, to a suspending state while switching a call link of the first cellular phone, which is in the incoming call receiving state, to a calling state.

* * * * *